United States Patent
Devine

(10) Patent No.: US 9,932,885 B2
(45) Date of Patent: Apr. 3, 2018

(54) TUNABLE TURBOCHARGER COMPRESSOR COVER

(71) Applicant: Bullseye Power, LLC, Muskegon, MI (US)

(72) Inventor: William Devine, Muskegon, MI (US)

(73) Assignee: Bullseye Power, LLC, Muskegon, MI (US)

( * ) Notice: Subject to any disclaimer, the term of this patent is extended or adjusted under 35 U.S.C. 154(b) by 538 days.

(21) Appl. No.: 14/613,552

(22) Filed: Feb. 4, 2015

(65) Prior Publication Data

US 2016/0222875 A1     Aug. 4, 2016

(51) Int. Cl.
| | |
|---|---|
| *F02B 33/44* | (2006.01) |
| *F02B 37/12* | (2006.01) |
| *F02C 6/12* | (2006.01) |
| *F04D 29/42* | (2006.01) |
| *F04D 29/46* | (2006.01) |
| *F04D 27/02* | (2006.01) |

(52) U.S. Cl.
CPC ............... *F02B 37/12* (2013.01); *F02C 6/12* (2013.01); *F04D 27/0253* (2013.01); *F04D 29/4213* (2013.01); *F04D 29/464* (2013.01); *F05D 2220/40* (2013.01); *F05D 2250/51* (2013.01); *Y02T 10/144* (2013.01)

(58) Field of Classification Search
CPC .. F04D 29/4213; F04D 29/441; F04D 29/685; F04D 29/464; F04D 17/025; F04D 27/002; F04D 27/0246; F02B 37/24
USPC .............................. 415/151, 158, 157; 60/611
See application file for complete search history.

(56) References Cited

U.S. PATENT DOCUMENTS

| | | | |
|---|---|---|---|
| 4,321,008 A * | 3/1982 | McCoy | F04D 29/464 415/157 |
| 2006/0117749 A1* | 6/2006 | Sumser | F04D 29/4213 60/599 |
| 2011/0002770 A1* | 1/2011 | Bywater | F02B 37/16 415/1 |
| 2014/0308110 A1 | 10/2014 | Houst et al. | |
| 2015/0098804 A1* | 4/2015 | Russalian | F04D 29/406 415/157 |
| 2015/0354591 A1* | 12/2015 | Ibaraki | F04D 29/464 415/147 |

(Continued)

FOREIGN PATENT DOCUMENTS

| | | | | |
|---|---|---|---|---|
| DE | 3708382 A1 * | 9/1988 | ........... | D01H 11/005 |
| DE | 10252767 A1 * | 5/2004 | ........... | F01D 17/141 |

(Continued)

*Primary Examiner* — Ngoc T Nguyen
(74) *Attorney, Agent, or Firm* — Butzel Long

(57) ABSTRACT

A turbocharger compressor housing is configured to allow a releasable fixed adjustment of a geometry of a compressor housing to increase at least one of responsiveness, efficiency or the ultimate power obtainable by a turbocharged system. Adjustability can be provided by an air intake pipe that is threadably connected with a central portion of the compressor housing to allow an air gap between the housing and the intake pipe to be adjusted to create an effect similar to adjusting the inducer area of a compressor wheel disposed in the housing, whereby power can be exchanged for efficiency and responsiveness. Set screws may be used to releasably fix the position of the intake pipe relative to the compressor housing.

5 Claims, 5 Drawing Sheets

(56) References Cited

U.S. PATENT DOCUMENTS

2016/0238012 A1* 8/2016 Nejedly .............. F04D 27/0246

FOREIGN PATENT DOCUMENTS

DE        102005019896 A1 * 11/2006 ........... F01D 17/162
JP              5622965 B1 * 11/2014

* cited by examiner

TUNABLE TURBOCHARGER COMPRESSOR COVER

CROSS-REFERENCE TO RELATED APPLICATIONS

Not applicable.

FIELD OF THE DISCLOSURE

This disclosure relates to turbochargers, and more particularly to a turbocharger having a compressor housing that has an adjustable geometry to allow the turbocharger compressor to be tuned to a particular application.

BACKGROUND OF THE DISCLOSURE

Turbochargers are used in conjunction with internal combustion engines in vehicles (e.g., trucks, automobiles, tractors, etc.) to increase power output, improve efficiency, lower emissions or to achieve a combination of these advantages or improvements. A turbocharger is comprised of a turbine that converts kinetic energy in the combustion products exhausted from the engine into mechanical work that is transmitted to a compressor that draws in ambient air and discharges the air at a higher pressure. The higher pressure air discharged from the turbocharger compressor is conveyed to the air intake manifold of the internal combustion engine, providing a higher mass flow of oxygen to the cylinders. The increased mass flow of oxygen is accompanied by an increased mass flow of fuel to the cylinders leading to more combustion and power per piston stroke.

While turbocharger performance depends on a variety of factors, as a general rule, the responsiveness of a turbocharged system can be increased by decreasing the effective inducer radius for a given compressor wheel having a fixed exducer radius. However, this is typically accompanied by a reduction in the maximum power that can be achieved by the system. Reciprocally, the maximum achievable power can generally be increased by increasing the effective inducer radius for a given compressor wheel having a fixed exducer radius. Thus, for a balanced turbocharged system that provides some combination of increased power, increased fuel efficiency, and reduced harmful emissions, there is a trade-off between the maximum power than can be developed by the turbocharged system and the responsiveness of the system (i.e., the time it takes to reach maximum power).

Typically, the relationship between exducer radius and inducer radius is fixed, with the compressor housing being deliberately designed so that the air inlet to the compressor wheel has a diameter greater than the diameter of the inducer portion of the compressor wheel. However, Patent Application Publication No. US 2014/0308110 A1 discloses that the inlet cross-sectional area to the inducer portion of the compressor wheel can be altered by effectively reducing the inducer area of the compressor wheel to reduce lag time or spool-up time (i.e., the time it takes to increase the rotational speed of the compressor wheel sufficiently to achieve increased power output from the turbocharged system), and increase efficiency, but at the expense of reduced maximum power. This document also teaches that the effective inducer area can be increased to increase the maximum power output, but at the expense of reduced efficiency and responsiveness.

Patent Application Publication No. 2014/0308110 discloses various adjustable wall compressor housings and mechanical or fluid-mechanical mechanisms for adjusting the housing geometry via a controller in response to various parameters, such as engine power demand, engine emissions, atmospheric pressure, compressor back pressure, exhaust back pressure, ambient temperature, compressed air temperature, exhaust gas recirculation, etc. This complex arrangement may have some value in certain applications. However, variable geometry compressor housings responsive to operating parameters require many sensors and many moving parts that are expensive and more susceptible to failure than fixed geometry compressor housings.

While conventional fixed geometry compressor housings are highly reliable and considerably less expensive than variable geometry compressor housings, they cannot be easily reconfigured or tuned as desired to trade between power and responsiveness or between power and efficiency.

SUMMARY OF THE DISCLOSURE

Disclosed is a motor vehicle having a turbocharged combustion system employing a turbocharger compressor having a turbocharger compressor housing that is configured to facilitate a fixed adjustment of the compressor housing geometry, allowing the turbocharger to be tuned or adapted for particular applications as desired to trade between power and responsiveness or between power and efficiency.

In certain aspects of this disclosure, the turbocharger compressor housing includes an air inlet defined by a cylindrical wall concentrically disposed between a peripherally located volute portion of the housing and a central portion of the housing. The cylindrical wall has a lower shoulder portion having an upwardly projecting circumferential rim, and a plurality of posts angularly separated from each other along an inwardly facing surface of the cylindrical wall and extending radially inwardly from the inwardly facing surface of the cylinder wall toward the central portion of the housing. Inwardly facing surfaces of the posts are threaded to cooperatively engage an externally threaded portion of an air intake pipe. The air intake pipe includes a cylindrical portion that is at least partially threaded to engage the threads of the posts and a lower edge that is adjustably positionable to define an air gap between an upper surface of the circumferential rim and the lower edge of the air intake pipe. An annular volume is defined between an outwardly facing surface of the air intake pipe and the inwardly facing surface of the cylindrical wall. The air intake pipe can be rotated with respect to the cylindrical wall of the compressor housing to position the air intake pipe as desired to adjust the gap between the upper surface of the circumferential rim and the lower edge of the air intake pipe to adjust the volume of the annular opening to constrict air flow or to facilitate more air flow. This has an effect that is similar to adjusting the inducer area of the compressor wheel to adjust the trim of the compressor, making it possible to exchange maximum obtainable power for improved efficiency or responsiveness, or sacrifice some efficiency and responsiveness for a higher maximum obtainable power.

In order to prevent rotation of the air intake pipe with respect to the cylindrical wall of the compressor housing due to vibrations during operation of the turbocharged engine system, the compressor housing can be provided with mechanical restraints to lock the position of the air intake pipe during operation of the turbocharged systems.

DETAILED DESCRIPTION

Figure 1:
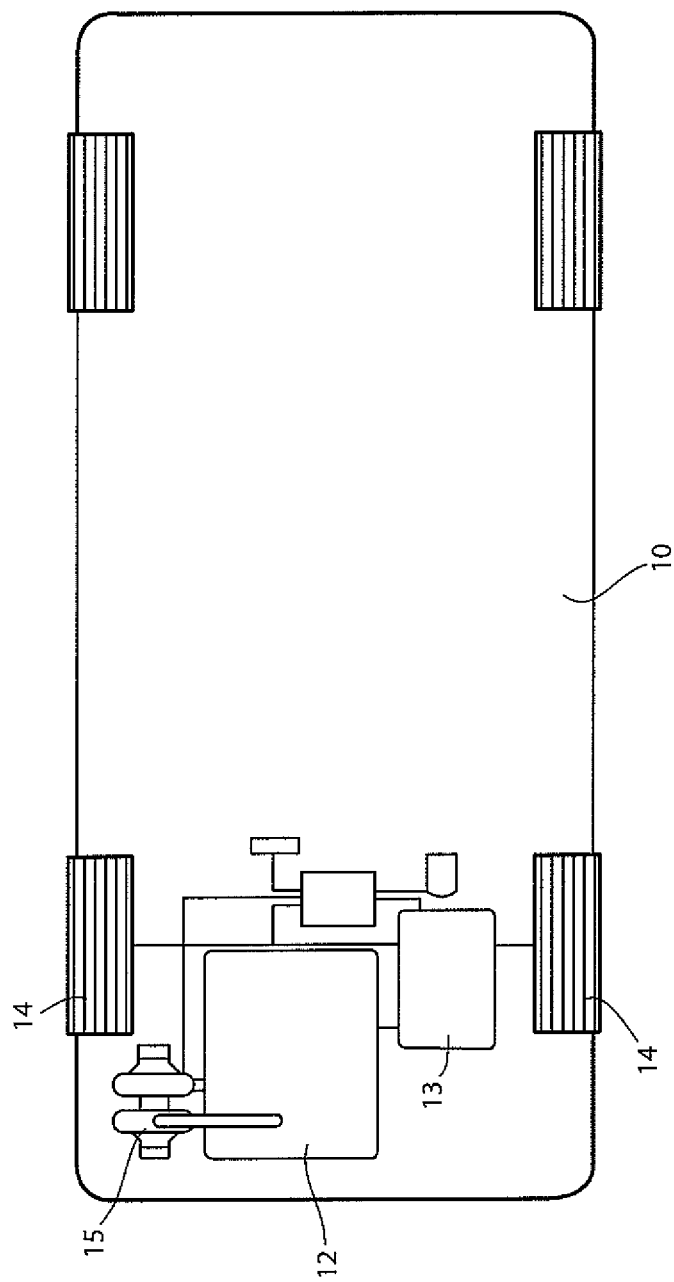
FIG. 1 is a schematic representation of a vehicle having an internal combustion engine and a turbocharger in accordance with this disclosure.

Shown in FIG. 1 is a schematic illustration of a vehicle 10 having an internal combustion engine 12 mechanically linked to a transmission 13 that drives wheels 14. A turbocharger 15 is provided to increase the efficiency of and/or the power from the engine 12.

Figure 2:
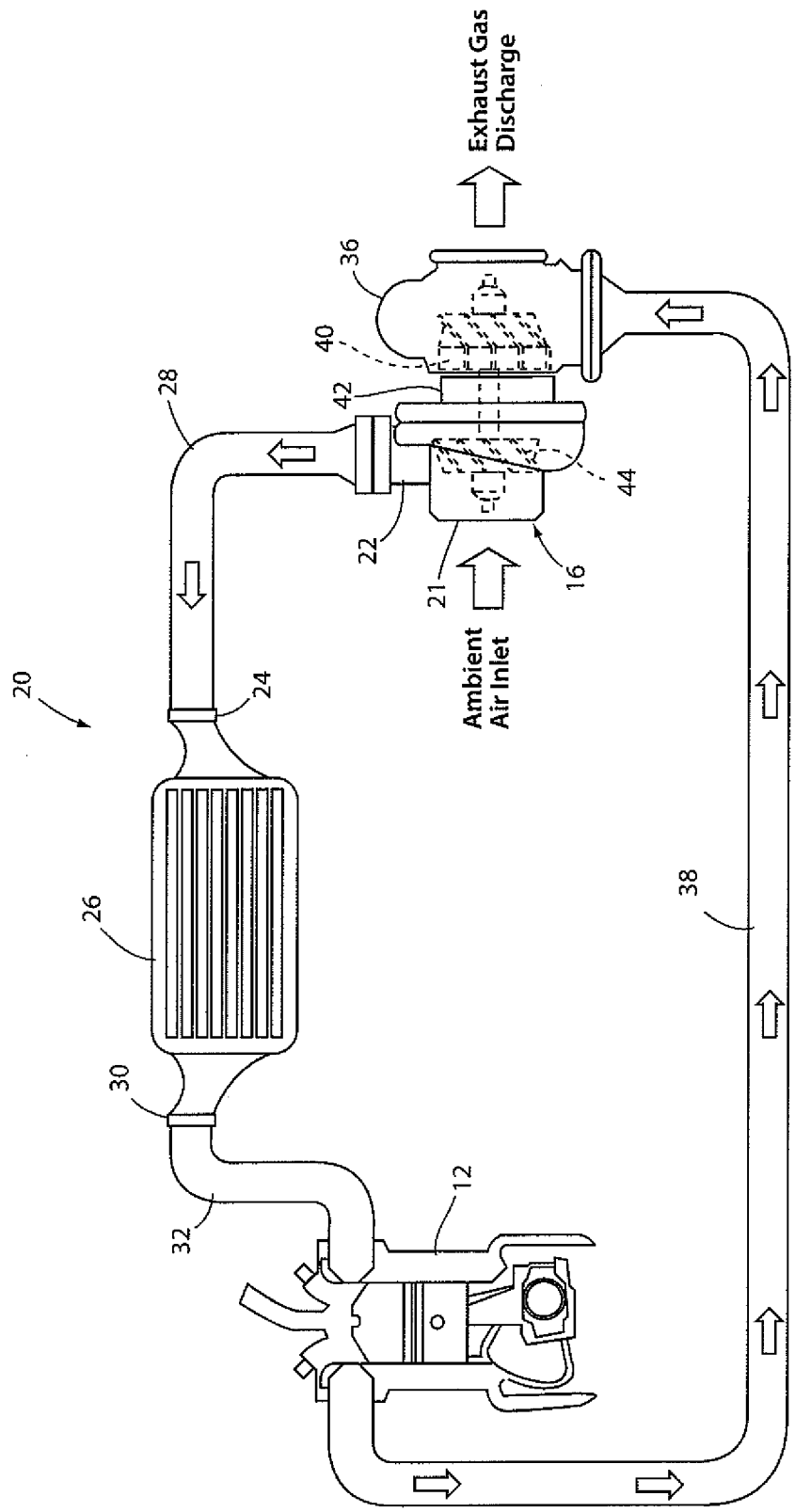
FIG. 2 is a schematic representation of a turbocharged internal combustion engine in accordance with this disclosure.

A turbocharger system 20 is shown in FIG. 2. The system 20 incorporates turbocharger 15 which includes a compressor 16 that draws ambient air into inlet 21 and discharges compressed air from discharge outlet 22. The compressed air from discharge outlet 22 is conveyed to an air cooler inlet port 24 of an air cooler 26 via pipe 28. Air flows over fins of the cooler 26 as the vehicle moves, cooling the compressed air before it exits cooler 26 from cooler outlet port 30 and is conveyed to an air intake manifold of engine 12 via pipe 32. Combustion products exhausted from engine 12 flow to a turbine 36 via a pipe 38. The exhaust gases cause rotation of a turbine wheel 40 that is connected with a shaft 42 that drives a compressor wheel 44.

Figure 3:
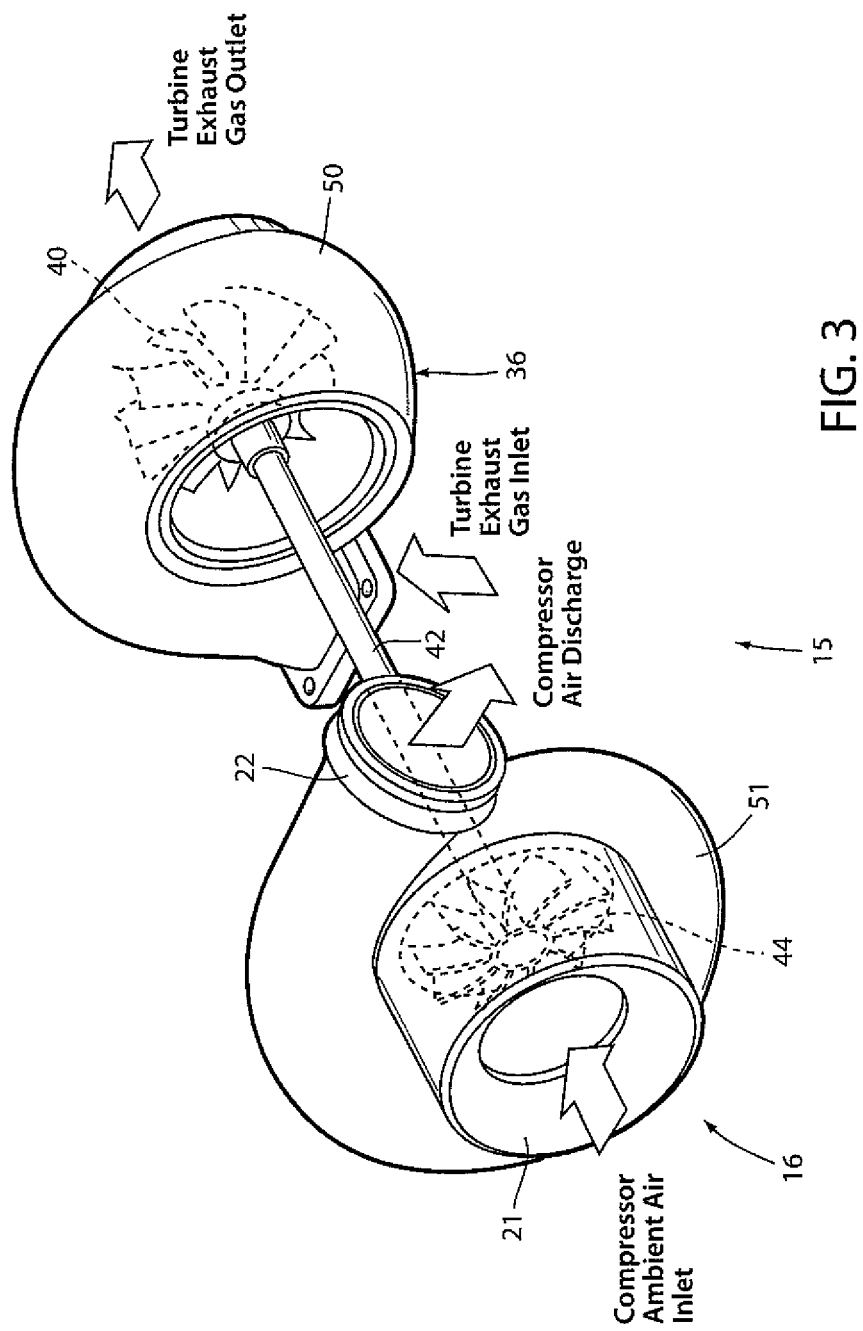
FIG. 3 is a perspective view of a turbocharger with a portion broken away to show internal components.

Details of turbocharger 15 are shown in FIG. 3. Each of compressor 16 and turbine 36 has a housing 50 and 51, respectively, that define the inlets and outlets for air and combustion products, respectively.

Figure 4:
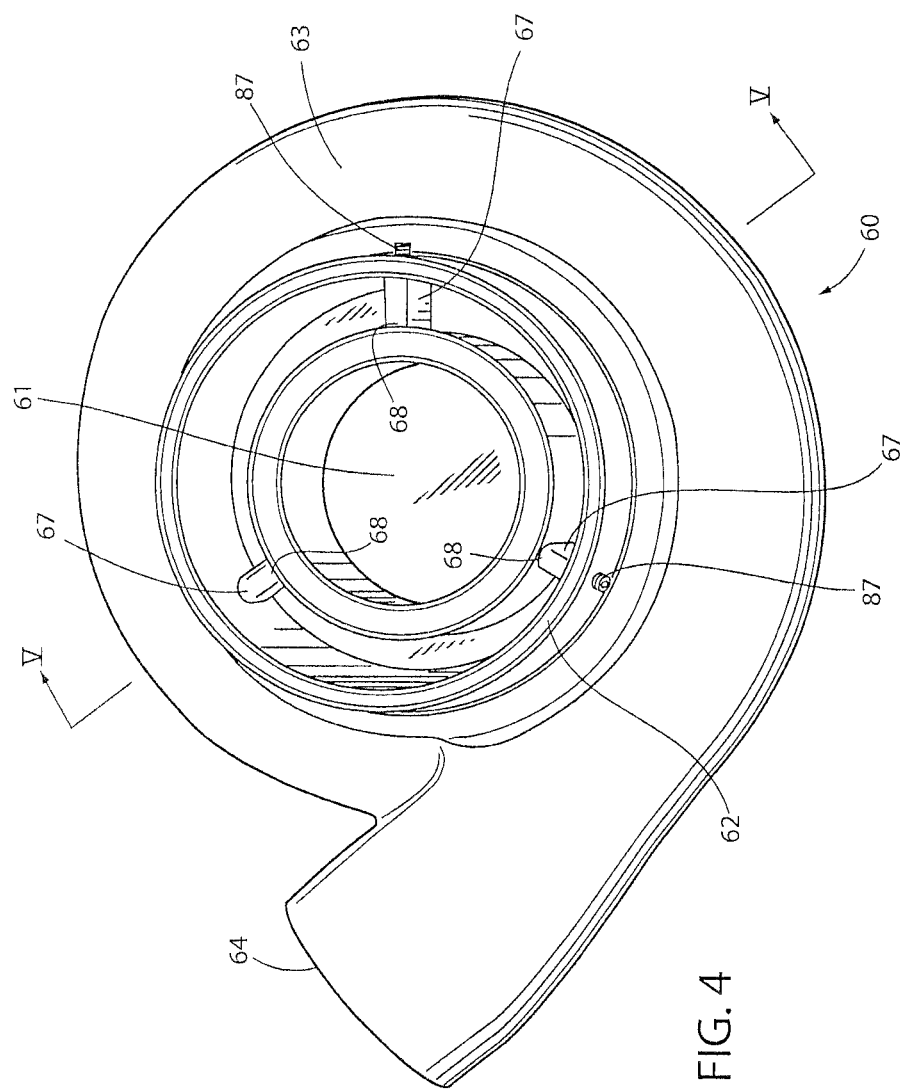
FIG. 4 is a top view of a turbocharger compressor housing component.

A compressor housing component 60 is shown in FIG. 4. Housing component 60 includes a central portion 61 where the compressor wheel is positioned, a cylindrical wall 62 that generally defines an air inlet port and a volute portion 63 that terminates at outlet nozzle 64. Cylindrical wall 62 is disposed approximately concentrically between central portion 61 and volute portion 63.

Figure 5:
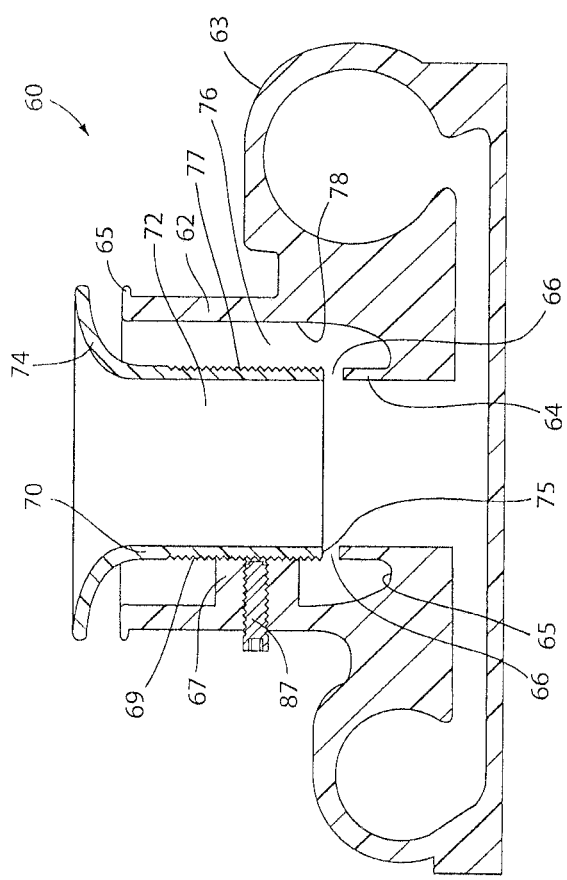
FIG. 5 is a cross-sectional view along lines 5-5 of FIG. 4.

As shown in FIG. 5, cylindrical wall 62 has a distal lip portion 65. Projecting radially inwardly from an inwardly facing surface of cylindrical wall 62 are a plurality of posts or stanchions 67 that are angularly separated from each other. In the illustrated embodiment, there are three posts 67 approximately equally separated by an angle of about 120 degrees. However, more posts 67 may be employed, and the separation between posts 67 can be uniform or non-uniform. Inwardly facing surfaces 68 of posts 67 are threaded to cooperatively threadingly engage external threads 69 on air intake pipe 70. Pipe 70 includes a generally cylindrically shaped portion 72 and a flared bell-shaped portion 74.

The intake pipe 70 can be rotated and threadingly engaged with posts 67 to position intake pipe 70 relative to housing component 60 to adjust a gap 66 between an upper surface of a circumferential wall 64 projecting upwardly from shoulder portion 65 of component 60 and a lower edge 75 of air intake pipe 70, and to adjust the volumetric air flow from an annular volume 76 defined between an outwardly facing surface 77 of air intake pipe 70 and an inwardly facing surface 78 of cylindrical wall 62. Adjustable gap 66 acts as an adjustable map width enhancement groove that can be tuned to increase the efficiency of the compressor and maximize air flow.

Adjustment of the position of air intake pipe 70 relative to cylindrical wall 62 has the effect of regulating the flow of air into the compressor to either constrict flow or allow greater air flow, and thereby adjust the trim of the compressor. Such adjustments allow power to be exchanged for efficiency or responsiveness, or to exchange responsiveness and/or efficiency for power, as desired for particular applications.

In order to lock the intake pipe 70 in place to prevent movement due to vibration during operation, a mechanical restriction such as a set screw 87 can be provided. Set screw 87 can be threadably received in a bore extending through post 67 and wall 62. This releasably fixes the adjustment of the air intake pipe 70 relative to the cylindrical wall 62 and thereby fixes the geometry of the housing. Readjustment, such as to tune the turbocharger for a different application, is easily achieved by loosening set screws 87 to facilitate rotation of pipe 70 to adjust the air gap and regulate air flow as desired, followed by re-tightening of the set screws.

While the present invention is described herein with reference to illustrated embodiments, it should be understood that the invention is not limited hereto. Those having ordinary skill in the art and access to the teachings herein will recognize additional modifications and embodiments within the scope thereof. Therefore, the present invention is limited only by the claims attached herein.

What is claimed is:

1. A turbocharger compressor housing comprising an air inlet defined by a cylindrical wall concentrically disposed between a volute portion of the housing and a central portion of the housing, the cylindrical wall having a shoulder portion, a circumferential wall projecting upwardly from the shoulder portion, a plurality of posts angularly separated from each other and projecting radially inwardly from an inwardly facing surface of the cylindrical wall toward the central portion of the housing, each post having an inwardly facing threaded surface, an air intake pipe having a cylindrical portion that includes an externally threaded section engaged with the inwardly facing threaded surfaces of the posts and having an edge that is adjustably positionable to define a gap between a surface of the circumferential wall and the edge of the air intake pipe, and an annular volume defined between an outwardly facing surface of the air intake pipe and the inwardly facing surface of the cylindrical wall.

2. The turbocharger compressor housing of claim 1, in which a threaded bore extends in a radial direction through the cylindrical wall and one of the posts, and a set screw is threadingly disposed in the bore with an inwardly facing surface of the set screw engaging an outer surface of the intake pipe to lock it in a selected position.

3. A turbocharged system for a vehicle, comprising: an internal combustion engine; a turbine configured to be driven by exhaust from the internal combustion engine; an output shaft from the turbine; and a compressor having a housing containing a compressor wheel coupled to the output shaft, the compressor housing having an air inlet defined by a cylindrical wall concentrically disposed between a volute portion of the housing and a central portion of the housing, the cylindrical wall having a shoulder portion, a plurality of posts angularly separated from each other and projecting radially inwardly from an inwardly facing surface of the cylindrical wall toward the central portion of the housing, each post having an inwardly facing threaded surface, an air intake pipe having a cylindrical portion that includes an externally threaded section engaged with the inwardly facing threaded surfaces of the posts and having an edge that is adjustably positionable to define a gap between the shoulder portion of the cylindrical wall and the edge of the air intake pipe, and an annular volume defined between an outwardly facing surface of the air intake pipe and the inwardly facing surface of the cylindrical wall.

4. The turbocharged system of claim 3, in which a threaded bore extends in a radial direction through the cylindrical wall and one of the posts, and a set screw is threadingly disposed in the bore with an inwardly facing surface of the set screw engaging an outer surface of the intake pipe to lock the intake pipe in a selected position.

5. A vehicle comprising:
   an internal combustion engine mechanically linked to a transmission that drives wheels;
   a turbine configured to be driven by exhaust from the internal combustion engine;
   an output shaft from the turbine; and
   a compressor having a housing containing a compressor wheel coupled to the output shaft, the compressor housing having an air inlet defined by a cylindrical wall concentrically disposed between a volute portion of the housing and a central portion of the housing, the cylindrical wall having a shoulder portion, a circumferential wall projecting upwardly from the shoulder portion, a plurality of posts angularly separated from each other and projecting radially inwardly from an inwardly facing surface of the cylindrical wall toward the central portion of the housing, each post having an inwardly facing threaded surface, an air intake pipe having a cylindrical portion that includes an externally threaded section engaged with the inwardly facing threaded surfaces of the posts and having an edge that is adjustably positionable to define a gap between a surface of the circumferential wall and lower edge of the air intake pipe, and an annular volume defined between an outwardly facing surface of the air intake pipe and the inwardly facing surface of the cylindrical wall.

* * * * *